US008182630B2

(12) United States Patent
Canet et al.

(10) Patent No.: US 8,182,630 B2

(45) Date of Patent: May 22, 2012

(54) METHOD OF PRODUCING DECORATIVE PAPERS FOR LAMINATED MATERIALS

(75) Inventors: Enric Canet, Barcelona (ES); Àngel Delgado, Barcelona (ES)

(73) Assignee: Lamigraf, S.A., Barcelona (ES)

( * ) Notice: Subject to any disclaimer, the term of this patent is extended or adjusted under 35 U.S.C. 154(b) by 2 days.

(21) Appl. No.: 12/012,538

(22) Filed: Feb. 4, 2008

(65) Prior Publication Data

US 2008/0218775 A1 Sep. 11, 2008

(30) Foreign Application Priority Data

Feb. 5, 2007 (EP) .................................... 07002446

(51) Int. Cl.
*G06K 15/02* (2006.01)

(52) U.S. Cl. ......................... 156/219; 156/209; 156/277

(58) Field of Classification Search .................... 156/71, 156/219, 209, 277
See application file for complete search history.

(56) References Cited

U.S. PATENT DOCUMENTS

2003/0203165 A1* 10/2003 Nobles et al. ............. 428/195.1

* cited by examiner

*Primary Examiner* — Khanh P Nguyen
*Assistant Examiner* — John Blades
(74) *Attorney, Agent, or Firm* — Collard & Roe, P.C.

(57) ABSTRACT

The invention relates to a method of producing a decorative paper for a laminated material. The method comprises the steps of scanning a sample of a natural material for generating a digital image (10, 11, 12, 13), constructing a decorative motif (15, 16, 17, 18) by means of computer-assisted processing of the digital image (10, 11, 12, 13), and generating the decorative paper by printing the decorative motif (15, 16, 17, 18). The invention suggests that the step of digital image processing involves adapting the scanned digital image (10, 11, 12, 13) to a reference image (14). The object of the invention is to provide a design technique that allows to offer an almost arbitrarily large variety of decors to the consumers at low production costs.

6 Claims, 2 Drawing Sheets

METHOD OF PRODUCING DECORATIVE PAPERS FOR LAMINATED MATERIALS

CROSS REFERENCE TO RELATED APPLICATIONS

Applicants claim priority under 35 U.S.C. §119 of European Serial No. EP 07 002 446.8 filed Feb. 5, 2007.

The invention relates to a method of producing a decorative paper for a laminated material.

Traditional building and finishing materials, such as wood and stone, are generally preferred by consumers because of their highly valued look and feel. However, such natural materials are expensive to produce and to install. A solid wood floor may have a very high-quality luxury appearance, but the required materials and the labor required to install such floors tend to be prohibitively expensive.

Laminated materials, such as, e.g., so-called high-pressure or direct-pressure laminate boards (HPL, DPL) are known as alternatives to traditional building and finishing materials. These laminated materials comprise a decorative motif, preferably a printed decorative paper. This paper is arranged on a substrate fibre material. The laminate further comprises a top layer based on synthetic material. The decorative motif may, e.g., imitate a wood grain pattern.

One problem of known laminated materials is that their surface texture does not match their decorative motif. For example, a visual depiction of a wood nerve does not match the surface texture characteristics of a wood nerve. As a consequence, these materials look fake and can readily be identified as something other than a traditional building or finishing material.

A prior art approach to matching the surface texture of a laminated material to its decorative motif is forming a surface texture by means of mechanical embossing. A press machine is used during production of the laminated material. The mechanical embossing is achieved by means of a corresponding press plate having a three-dimensional surface comprising ridges and/or depressions that are aligned with the decorative motif of the printed decorative paper. High-quality laminated materials produced in this way are referred to as ‘embossed-in register’ laminates. These materials have the realistic look and feel of traditional building and finishing products.

The decorative papers for laminated materials of the type described before are usually produced by starting from a sample of a natural material, such as, e.g., wood or stone. The sample is scanned for generating a digital image of its surface. The raw image data then undergoes an elaborate digital image processing step in order to construct the final decorative motif. This decorative motif determines the natural appearance of the material. Finally, the decorative motif is printed on paper. This printed decorative paper is provided to the further laminate manufacturing process.

For the production of embossed-in register laminates, the decorative motif information is provided to a press plate manufacturer who applies an embossing pattern to the press plate of the press machine used in the laminate production process. This embossing pattern includes elevated ridges, dots, depressions, etc. of an appropriate design which is aligned (when the press plate is hot) with the decorative motif formed on the decorative paper.

One problem of the above-described method of manufacturing embossed-in register laminates is that the step of making the press plate for mechanical embossing the surface of the laminated material is comparatively expensive. A large variety of decors is demanded by the consumers. Consequently, a corresponding large number of press plates (one press plate for each decorative motif) is required because the embossing pattern, which is aligned with the decorative motif, is different for each decor.

Therefore it is readily appreciated that there is a need for an improved method that enables to produce embossed-in register laminates at reduced manufacturing costs. It is thus the object of the invention to provide a method that allows to offer an almost arbitrarily large variety of decors to the consumers without the need to produce an expensive press plate for each individual decorative motif.

In accordance with the present invention, a method of producing a decorative paper for a laminated material is disclosed. The method comprises the steps of scanning a sample of a natural material for generating a digital image, constructing a decorative motif by means of computer-assisted processing of the digital image, generating the decorative paper by printing the decorative motif. The method of the invention is characterised in that the step of digital image processing involves adapting the scanned digital image to a reference image.

The insight of the invention is that the scanned digital images of the material samples can be adapted to a common reference image by appropriate digital image processing techniques such that each constructed decorative motif finally matches the embossing pattern of a single press plate used during the further production process. The gist of the invention is thus the use of a single common reference for the design of a set of decorative motifs. If a set of decorative motifs is prepared according to the invention using a common reference image, a single embossing pattern can be used for each decorative motif from this set because the technique of the invention reliably ensures that the embossing pattern will be aligned with the respective decorative motif. Only a single press plate can be used for an arbitrarily large set of decorative motifs. The manufacturing costs of embossed-in register laminates are significantly reduced in this way.

In accordance with the invention, the match of a visual depiction of the scanned natural material in the adapted digital image with a visual representation of material characteristics contained in the reference image should be as good as possible in order to obtain an optimum quality of the final laminated material. However, a perfect alignment of the scanned image with the reference image is not necessary. Certain deviations can be tolerated without compromising the quality appearance of the laminated material. The match of the adapted digital image with the reference image determines the degree of coincidence of the embossed texture with the respective decorative motif of the printed paper. A higher degree of coincidence results in a better imitation of the natural material.

According to a preferred embodiment of the invention, a visual representation of material characteristics (such as the surface texture of the respective material) may be contained in the reference image. This depiction may, as mentioned above, serve as a basis for the design of the embossing pattern applied to the press plate. It is also possible to design the press plate on the basis of a set of decorative motifs adapted to a single common reference image in accordance with the invention. The embossing pattern may include elevated ridges, dots, depressions, etc. of a design which is aligned with the respective decorative motifs. As a consequence, the surface texture of the laminated materials optimally enhances the decorative motifs of the decorative papers.

The natural material scanned according to the invention may be wood, wherein the reference image may contain a corresponding visual depiction of a wood grain pattern, such as wood nerves, wood knots, or wood pores. Two or more samples of different types of wood, such as, e.g., oak, cherry, or walnut, may be scanned, wherein the digital images of the two or more samples are adapted to a single reference image. The reference image can advantageously be generated by simply extracting the visual depictions of the surface texture of one of the scanned samples. As described above, only a single press plate is required for producing embossed-in register laminates on the basis of the two or more wood motifs in accordance with the invention.

The step of digital image processing of the method of the invention may involve at least one of the following techniques: geometric transformation; correction of color, brightness, and/or contrast; registration of the scanned digital image and the reference image; removal of unwanted image elements; image skew; image distortion. Each of these techniques may be applied locally or globally to the image data. Appropriate software products for digital image processing according to the invention, such as, e.g. Adobe Photoshop, are commercially available.

The following drawings disclose preferred embodiments of the present invention. It should be understood, however, that the drawings are designed for the purpose of illustration only and not as a definition of the limits of the invention.

In the drawings

Figure 1:
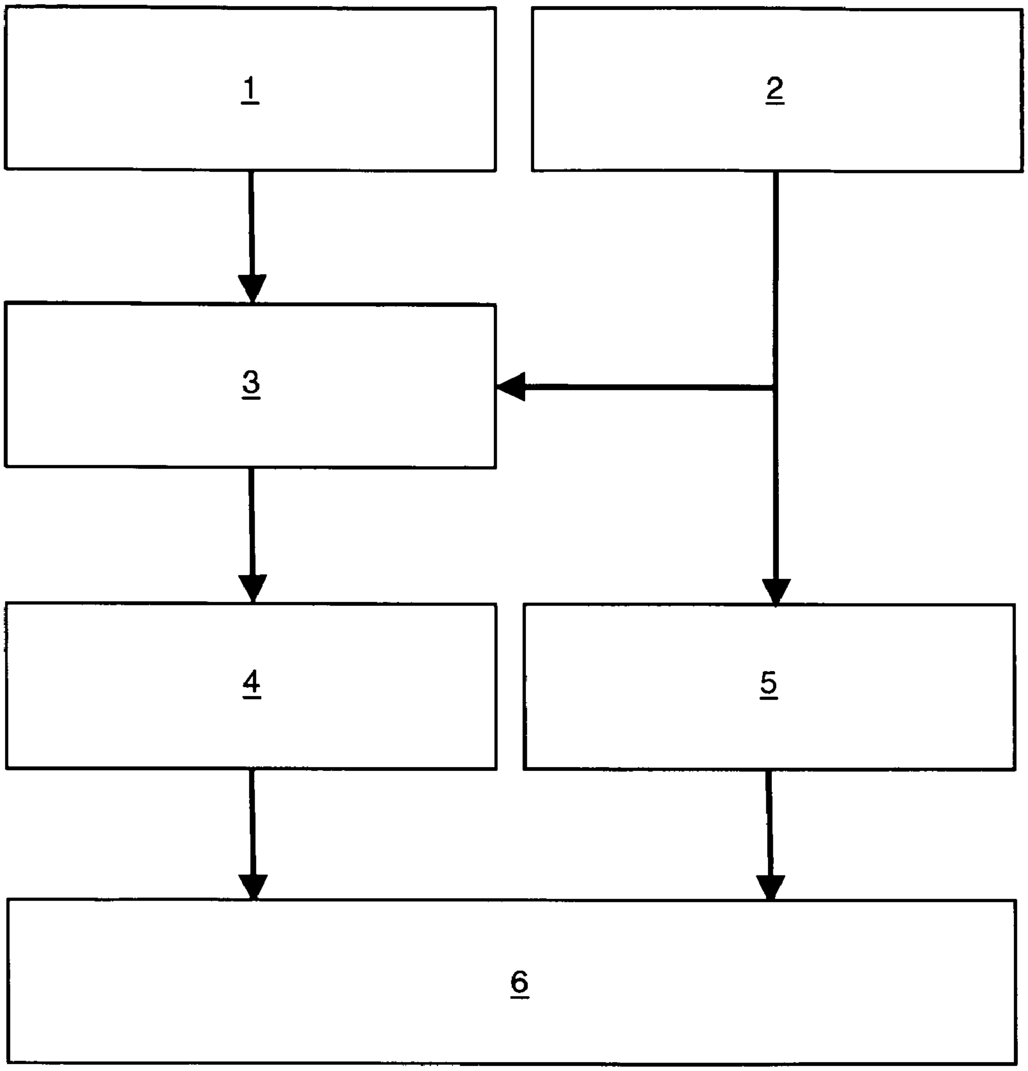
FIG. 1 illustrates the method of the invention and its application as a flow-chart.

The method shown in FIG. 1 starts from a sample of a natural material, such as, e.g., wood, which is scanned for generating a digital image in step 1. A reference image containing a visual representation of the surface texture of a laminated material is provided in step 2. The reference image is provided in the preferred embodiment by extracting the visual depictions of the surface texture from the digital image of (at least one) further wood sample. The visual depictions contained in the reference image may be lines running along the course of the wood nerves in the scanned digital image. In step 3 a decorative motif is constructed by means of computer-assisted processing of the digital image generated in step 1. The digital image processing in step 3 involves adapting the scanned digital image to the reference image provided in step 2. This adaptation may be performed, e.g. by local geometric transformation, skew, and/or distortion of the digital image scanned in step 1, such that the wood nerves depicted in the image scanned in step 1 are (to a greater or lesser extent) in coincidence with the wood nerve pattern contained in the reference image. The result of the image processing step 3 is a decorative motif which is printed on paper in step 4. The decorative motif information and/or the reference image are provided to a press plate manufacturer in step 5, who applies an embossing pattern to a press plate of a press machine used in the final step 6 of laminate production. The embossing pattern includes elevated ridges, dots, depressions, etc. of an appropriate design which is aligned with the decorative motif formed on the decorative paper. The press plate manufacturer can create the design of the embossing pattern at his discretion on the basis of the image data provided to him such that the surface texture of the finally produced laminated material optimally enhances the decorative motifs of the printed papers.

Figure 2:
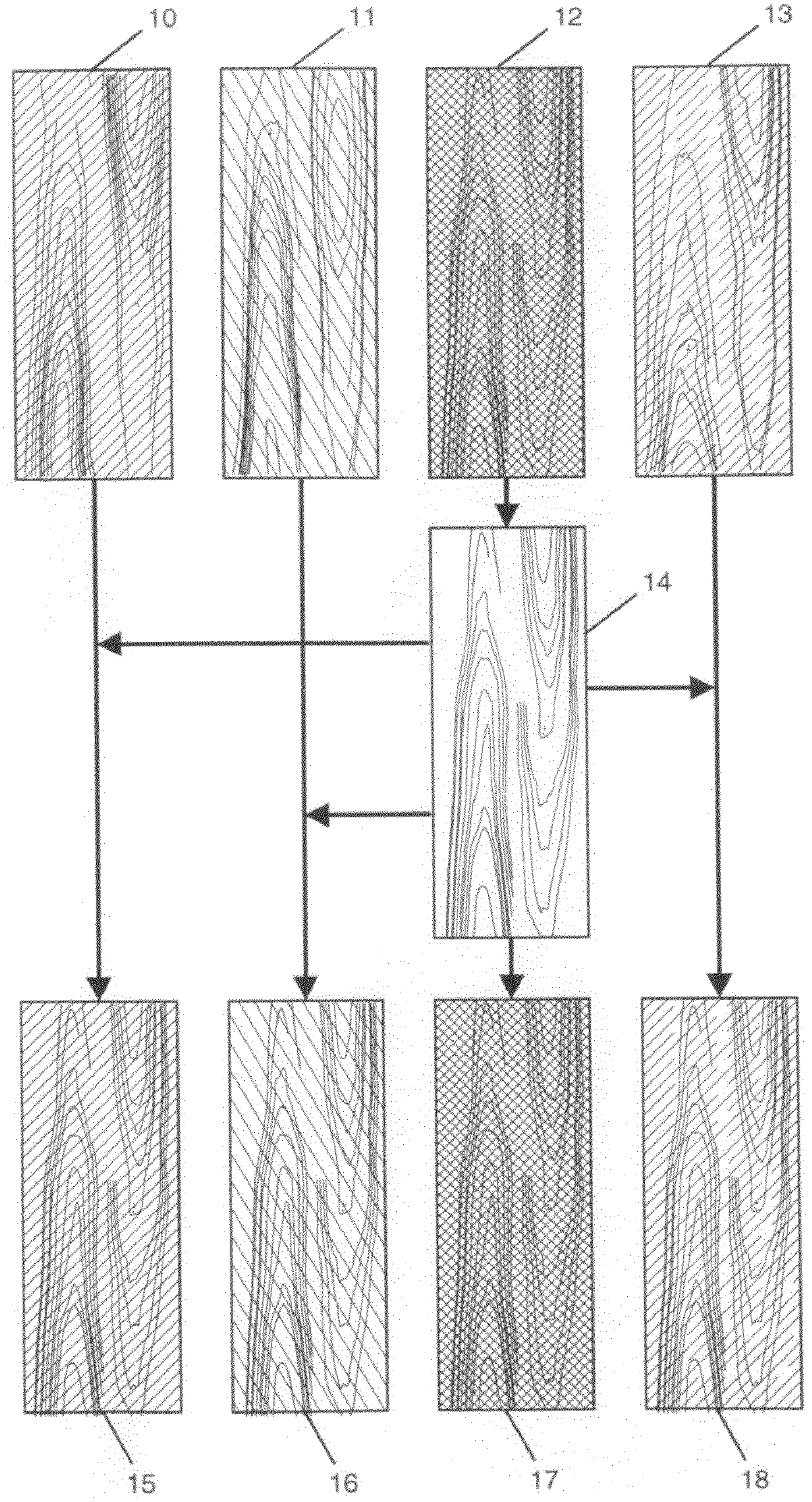
FIG. 2 shows schematic representations of the digital image data processed according to the invention.

FIG. 2 schematically shows digital images 10, 11, 12, and 13 which are generated by scanning four different types of wood, such as, e.g., oak, walnut, cherry, and beech. As can be seen in FIG. 2, each type of wood has its own individual wood grain pattern. The scanned images 10, 11, 12, and 13 constitute the basis for decorative motifs for the production of laminates in accordance with the invention. The wood grain pattern of image 12, the scanned cherry sample, is selected as a reference. A reference image 14 is extracted from image 12. The reference image 14 contains a line pattern representing the course of the wood nerves in image 12. Images 10, 11, and 13 are processed by means of common image processing techniques in order to adapt their wood grain pattern to the pattern depicted in the reference image 14. The result is a set of four different decorative motifs 15, 16, 17, and 18 for laminates imitating oak, walnut, cherry, and beech. The wood grain patterns of the four decorative motifs 15, 16, 17, and 18 essentially coincide with the reference image 14. Embossed-in register laminates can be produced on the basis of these motifs using only a single press plate. The embossing pattern of the press plate can advantageously be designed on the basis of all four motifs 15, 16, 17, and 18. The surface texture of the final laminated material matches each decorative motif 15, 16, 17, and 18 because of the alignment of each image 10, 11, 12, and 13 with the reference image 14. The oak, walnut, cherry, and beech laminates all have the realistic look and feel of traditional building and finishing products and can be manufactured at low cost.

While the decorative motifs illustrated in FIG. 2 represent wood grains, it should be appreciated that other embossed-in register designs, such as ceramic tiles, concrete, marble, abstracts, textile, leather, etc. may be produced according to the invention.

The invention claimed is:

1. Method of producing a decorative paper for a laminated material, the method comprising the following steps:

scanning a sample of a natural material for generating a digital image (10, 11, 12, 13);

constructing a decorative motif (15, 16, 17, 18) by means of computer-assisted processing of the digital image (10, 11, 12, 13);

generating the decorative paper by printing the decorative motif (15, 16, 17, 18);

wherein the step of digital image processing involves adapting the scanned digital image (10, 11, 12, 13) to a reference image (14), thereby matching a visual depiction of the surface texture of the scanned sample of natural material contained in the scanned digital image (10, 11, 12, 13) with a visual representation of a surface texture contained in the reference image (14); and wherein visual representations of material characteristics contained in each decorative motif (15, 16, 17, 18) correspond to an embossing pattern of a single press plate of a press machine used to produce the surface texture of the laminated material.

2. Method of claim 1, wherein the decorative motif (15, 16, 17, 18) is constructed such that a visual depiction of the scanned natural material contained in the digital images (10, 11, 12, 13) is matched with a visual representation of material characteristics contained in the reference image (14).

3. Method of claim 1, wherein the surface texture of the laminated material matches the decorative motif (15, 16, 17, 18) of the decorative paper.

4. Method of claim 1, wherein the natural material is wood, wherein the reference image (14) contains a visual depiction of a wood grain pattern, such as wood nerves, wood knots, or wood pores.

5. Method of claim 4, wherein two or more samples of different types of wood are scanned, wherein the digital images (10, 11, 12, 13) of the two or more samples are adapted to a single reference image (14).

6. Method of claim 1, wherein the step of digital image processing involves at least one of the following techniques:

geometric transformation;

correction of color, brightness, and/or contrast;

registration of the scanned digital image (10, 11, 12, 13) and the reference image (14);

removal of unwanted image elements;

image skew;

image distortion.

* * * * *